United States Patent [19]

Adams et al.

[11] Patent Number: 5,631,955
[45] Date of Patent: May 20, 1997

[54] OPTION BUS

[75] Inventors: Joel Q. Adams, Pflugerville; David C. Black; William F. Dunn, Jr., both of Austin, all of Tex.; Norman Endick, Munich, Germany; James B. Koehler, Cedar Creek, Tex.; Michael K. Kounnas, Austin, Tex.; John C. Krause, Austin, Tex.; Diep N. Le, Austin, Tex.; Larry A. Stell, Austin, Tex.

[73] Assignee: Siemens Business Communication Systems, Inc.

[21] Appl. No.: 440,720

[22] Filed: May 15, 1995

Related U.S. Application Data

[63] Continuation of Ser. No. 916,286, Jul. 17, 1992, abandoned.

[51] Int. Cl.$^6$ ............................................. H04M 1/00
[52] U.S. Cl. ........................... 379/387; 379/441; 379/396
[58] Field of Search .................................. 379/157, 165, 379/201, 357, 387, 388, 163, 164, 396, 441, 442, 447, 156

[56] References Cited

U.S. PATENT DOCUMENTS

| | | | |
|---|---|---|---|
| 3,800,097 | 3/1974 | Maruscek et al. | 379/166 |
| 4,616,360 | 10/1986 | Lewis | 370/67 |
| 4,684,941 | 8/1987 | Smith et al. | 340/825.52 |
| 4,685,121 | 8/1987 | Sanglier | 379/90 |
| 4,736,406 | 4/1988 | Molnar | 379/157 |
| 4,759,056 | 7/1988 | Akiyama | 379/357 |
| 4,816,826 | 3/1989 | Munter et al. | 340/825.52 |
| 4,817,127 | 3/1989 | Chamberlin et al. | 379/67 |
| 4,850,011 | 7/1989 | Delmage et al. | 379/201 |
| 4,969,136 | 11/1990 | Chamberlin et al. | 379/84 |
| 5,048,080 | 9/1991 | Bell et al. | 379/387 |
| 5,097,501 | 3/1992 | Kutzavitch | 379/387 |
| 5,136,585 | 8/1992 | Nizemuddin et al. | 370/110.1 |
| 5,142,564 | 8/1992 | Chu | 379/67 |
| 5,202,883 | 4/1993 | Hatherill et al. | 370/67 |
| 5,291,479 | 3/1994 | Voziri et al. | 370/58.2 |

FOREIGN PATENT DOCUMENTS

| | | |
|---|---|---|
| 0282197 | 9/1988 | European Pat. Off. . |
| 2221596 | 7/1990 | European Pat. Off. . |

OTHER PUBLICATIONS

"Computer Engineering", Morris M. Mano 1988 Prentice–Hall Inc. pp. 393–395.

"Computer Networks", Andrew S. Tanenbaum 1989 Prentice–Hall Inc. pp. 110–111.

*Primary Examiner*—Ahmad F. Matar
*Assistant Examiner*—Scott L. Weaver

[57] ABSTRACT

A method and apparatus for connecting remote options to a digital telephone base. Physical and communications protocols for connections and a flexible control scheme which can be as simple or elaborate as a given option requires are provided. The digital telephone includes an option bay connection, having a hierarchical control protocol. The option bay connection makes available several types of information, including: local analog audio, analog voice, digital voice, digital data and telephone control streams.

21 Claims, 5 Drawing Sheets

OPTION BUS

CROSS-REFERENCE TO RELATED APPLICATION

This is a continuation of Ser. No. 07/916,286 filed Jul. 17, 1992 now abandoned.

I. BACKGROUND OF THE INVENTION

A. Field of the Invention

This invention relates to telephony communications and related telephone bus protocols.

B. Related Art

A digital telephone may conventionally include at least two types of ports: a telephone line interface for connection with a telephone network, and a data communications interface for communications with a computer. For example, the ROLMphone (R) 244PC includes a telephony port for providing connection to a telephone network switch, such as a private branch exchange (PBX), and two data communications ports for providing connection to a computer.

In conventional telephones, the telephony communications link may be provided using a variety of protocols. For example, in the 244PC the connection to the network switch is accomplished by way of ROLMlink protocol. In many other conventional telephones, the connection to the switch is established by using an industry standard protocol such as ISDN. Transfers on the link from the switch to the phone are said to be "downlink" while transfers from the phone to the switch are said to be "uplink".

Once the information arrives at the telephone, it is distributed to the telephone's various components by way of an internal bus. Conventionally, the telephony link is connected to the internal bus by way of a link interface, which translates the telephony information into the proper format and timing in accordance with the internal bus standard.

The internal bus may be one of a number of types. A conventional standard for such internal busses is General Circuit Interface (GCI). The GCI standard, describes, among other things, the structure of data frames and the timing of certain signals.

It is known in the art to have option cards or modules which plug into the telephone's internal bus. For example, a plug in option card may be used to provide the telephone with a data connectivity feature. Sometimes, a dedicated slot or bay will be provided for each option, thus enabling the telephone to easily recognize which options are present or absent. In other instances, the options are connected to a common parallel bus having one conductor for each telephone signal or control line of interest.

II. SUMMARY OF THE INVENTION

It would be desirable to provide a digital telephone with a general option protocol that would enable a broad variety of options to be interchangeably connected to the telephone by way of a common bus, wherein internal telephone signals can be monitored and processed without the need for individual corresponding conductors. Thus, in accordance with the present invention, there is provided a method and apparatus for connecting remote options to a digital telephone base. The method provides physical and communications protocols for connections and provides a flexible control scheme which can be as simple or elaborate as a given option requires.

The present invention provides an option bay connection, having a hierarchical control protocol, to a digital telephone and makes available several types of information, including: local analog audio, analog voice, digital voice, digital data and telephone control streams. In addition, the present invention provides flexibility to connect both "intelligent" and "dumb" options, while not penalizing the dumb options with extra cost or complexity to connect to an intelligent network.

Intelligent options have the ability to prioritize themselves in terms of order of receiving messages from the telephone switch and for final review of messages being sent to the switch. This enables options to change the perception of the digital telephone device as a whole by intercepting and altering the message streams to/from the switch and the digital telephone (and other options). This is accomplished by including an option without requiring a change to the existing functionality of the other options or the main digital telephone. The change in perception may be nested across multiple options.

For example, a keyboard option can make the telephone behave like another telephone model with more keys by trapping its own indicator commands and translating indicator commands for units of a lower priority. In addition, any keys that are processed locally by the option can be communicated like the model of the base telephone and any keys from the base telephone and options below can be translated to the new model by the option. Also device IDs can be altered, making the unit respond as if it were another model.

An option can also be used to implement a non-native protocol to the base phone. For example, an option can be used to implement ISDN protocol while communicating with the base telephone and options below it in ROLMlink protocol.

In addition, options can selectively identify the type of information they request, thus reducing the volume of bus communications.

III. BRIEF DESCRIPTION OF THE DRAWING

The present invention will be better understood by reference to the drawing, wherein.

Like numbered reference numerals appearing in more than one figure represent like elements.

IV. DETAILED DESCRIPTION OF THE PREFERRED EMBODIMENT

Figure 1:
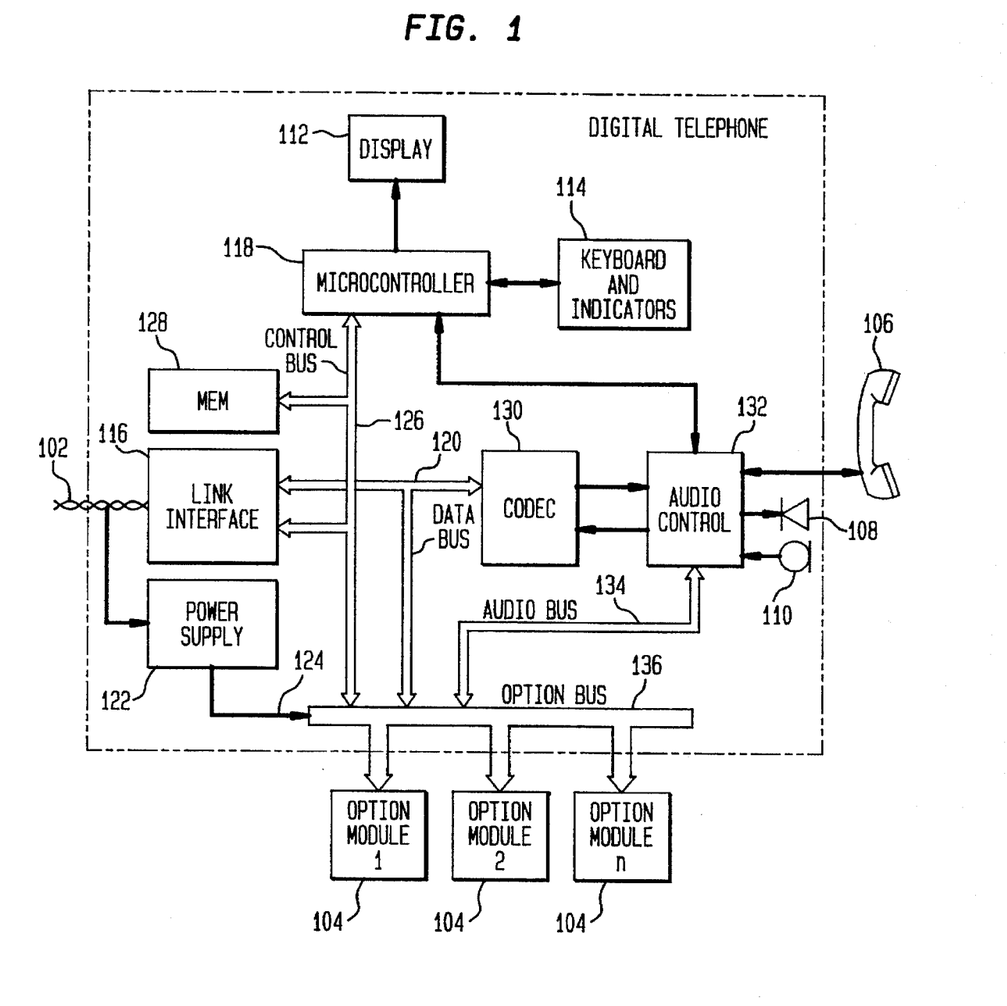
FIG. 1 is a diagram of a digital telephone according to an embodiment of the present invention.

An improved telephone, according to an embodiment of the present invention is illustrated schematically in FIG. 1.

The telephone includes a connection to a digital telephone line 102 (e.g. a ROLMlink line) and one or more connections for optional peripherals 104. The optional peripherals 104 will alternatively be referred to in this disclosure as Option modules 104. Typically, the telephone also has a handset 106, speaker 108, microphone 110, display 112, and keyboard 114 with keys and indicators.

The telephone is connected to the digital telephone line 102 via the link interface 116 which handles transfers of telephone control information between a microcontroller 118 and the digital telephone line 102. The link interface 116 also translates the digital telephone line's voice and data format to the data format used on the Option Data Bus 120. The link interface 116 also provides miscellaneous timing signals required by the rest of the telephone. Also connected to the telephone line 102 is a power supply 122 which converts the telephone line's voltage to other voltages required by the telephone. These voltages are distributed within the telephone on a Power Bus 124.

The microcontroller 118 is connected to the link interface 116 via an Option Control Bus 126. The microcontroller 118 is a conventional microprocessor which controls all the telephone's functions, and is the source and destination of all communications with a private branch exchange (PBX) switch (not shown). The microcontroller 118 is also connected to a keyboard 114 and, optionally, to a display 112. Microcontroller 118 may be implemented as plural microprocessors.

The keyboard 114 includes the telephone keys, the indicators and associated control logic. The display 112, typically an LCD device, is used to display messages sent from the PBX via the digital telephone line 102, or messages from an Option module 104 sent via the Option Control Bus protocol (described more in detail later in this document). Additionally, an external memory 128, which may be of non-volatile type, can be attached to the microcontroller 118 via the Option Control Bus 126.

A coder/decoder (CODEC) 130, is connected to the Option Data Bus 120 to convert the digital voice information to an analog form. The analog voice is amplified appropriately and routed to/from a handset 106 and/or a speaker 108 and microphone 110 by an audio control block 132. The audio routing is controlled by connections from the microcontroller 118. The audio control block 132 contains circuitry required for the hands-free speakerphone function. The audio control block 132 also routes analog audio signals to/from the Option Audio Bus 134 for use by the Option modules 104.

Figure 2:
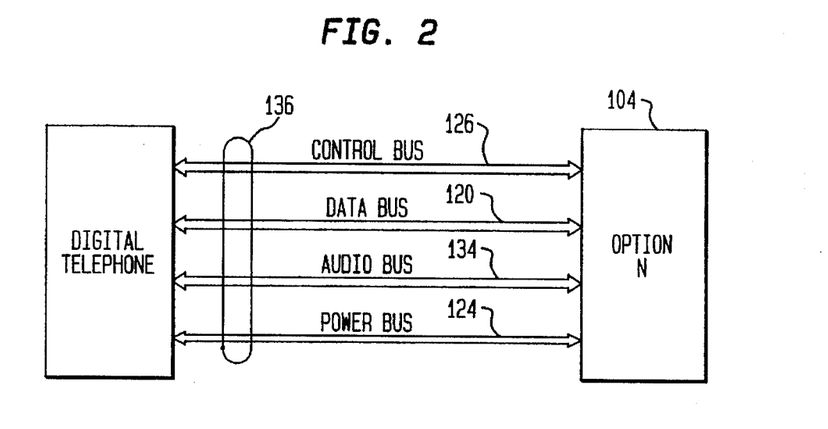
FIG. 2 details the components of the Option Bus of FIG. 1.

The Option Control Bus 126, the Option Data Bus 120, the Option Audio Bus 134 and the Power Bus 124 are collected together as the Option Bus 136. FIG. 2 further details the component busses of the Option Bus 136. The Option Bus 136 is linked to connectors in the telephone for connection to the Option modules 104. The Option modules 104 can be of the "plug-in" type which are user installable.

Purposes and functions of the Option modules 104 include but are not limited to additional keys and indicators, headset attachment, data communications, digital voice processing, alternate phone personality modules, etc. All resources and information of the telephone can be made available to an Option module 104, regardless in which Option module 104 bay it is connected. Resources include but are not limited to the handset 106, speaker 108, microphone 110, display 112, keys and indicators 114, and ringer circuits. Information includes downlink audio, uplink audio, audio from other modules, downlink control messages, uplink event messages, downlink data, and uplink data.

Access to the telephone resources and some of the information is arbitrated by the microcontroller 118 via a hierarchical option control protocol (described in more detail later in this document). Not all elements of the Option Bus 136 may be required by a Option module 104. For example, additional keys and indicators (sometimes referred to as a DSS) only require the Option Control Bus 126 and only those signals are needed at it's connector.

Figure 3:
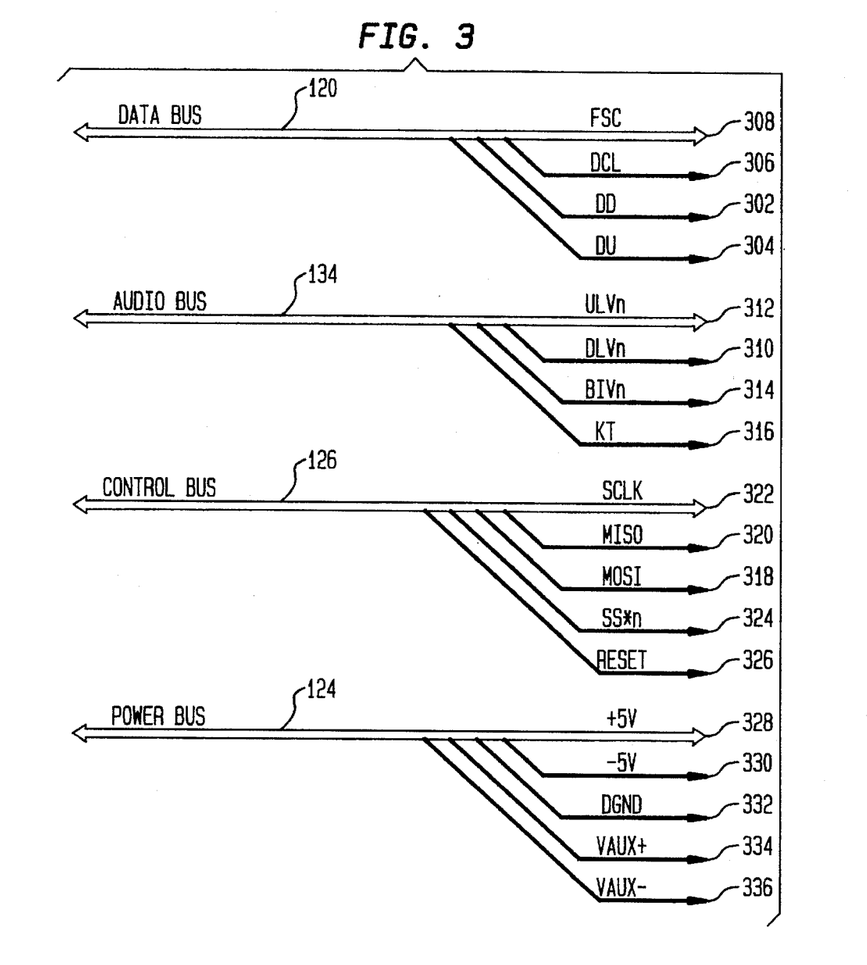
FIG. 3 is a more detailed diagram showing the component signal lines of the Data Bus, Audio Bus, Control Bus and Power Bus of FIG. 2.

FIG. 3 details the signals included in the Option Bus 136. The Option Data Bus 120 is based on the public domain standard GCI bus. The Option Data Bus 120 is a bit synchronous, time division multiplexed, full duplex, serial data bus. Downlink data from the link interface 116 is carried on Data Downstream (DD) line 302. Uplink data is carried on Data Upstream (DU) line 304 to the link interface 116. The Data Clock (DCL) line 306 carries the clocking signal, sourced by the link interface 116, which is in sync with the bit transfers. The Frame Sync (FSC) line 308 carries the FSC signal, which is indicative of the start of each data frame and is also sourced by the link interface 116.

Figure 4:
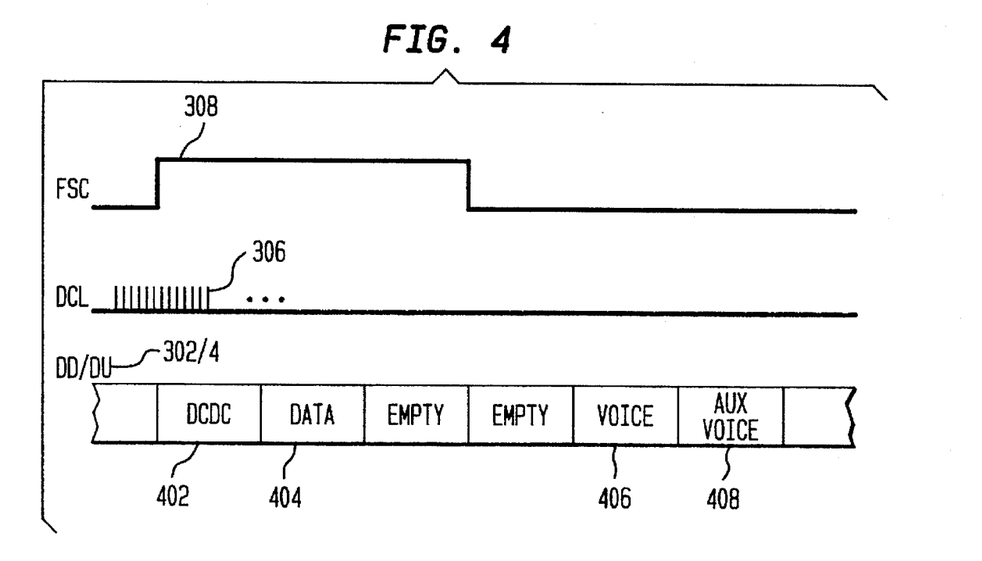
FIG. 4 is an examplary data from and control signals on the Data Bus of FIGS. 1–3.

Each data frame is organized into fields, as detailed in FIG. 4. These fields include Data Communications and Data Control (DCDC) 402, data 404, voice 406, and auxiliary voice 408. By using the timing relationships between the FSC and DCL signals, an Option module 104 can send or receive digital data or voice.

The CODEC 130 also transfers it's voice data to the link interface 116 via the Option Data Bus 120. In normal telephone operation the CODEC 130 transfers the voice data through the voice field 406. However, a special mode permits the CODEC 130 to transfer voice data through the auxiliary voice field 408, however, the voice data to and from the PBX remains in the voice field 406. This allows an Option module 104 to intercept the voice data for processing and then pass it on. This is useful for advanced digital audio processing applications.

Turning again to FIG. 3, the Option Audio Bus 134 provides Option modules 104 with access to several audio sources and destinations within the telephone. Downlink audio from the CODEC 130 is provided on Downlink Voice (DLVn) line 310. Uplink audio to the CODEC 130 is put onto the Uplink Voice (ULVn) line 312. Audio to be sent devices in the telephone base such as the handset 106 or the speaker 108, is put on the Base Input Voice (BIVn) line 314. It should be understood that unique DLVn, ULVn and BIVn lines 310–314 are provided to each Option module 104 (as denoted by the subscript n).

Figure 5:
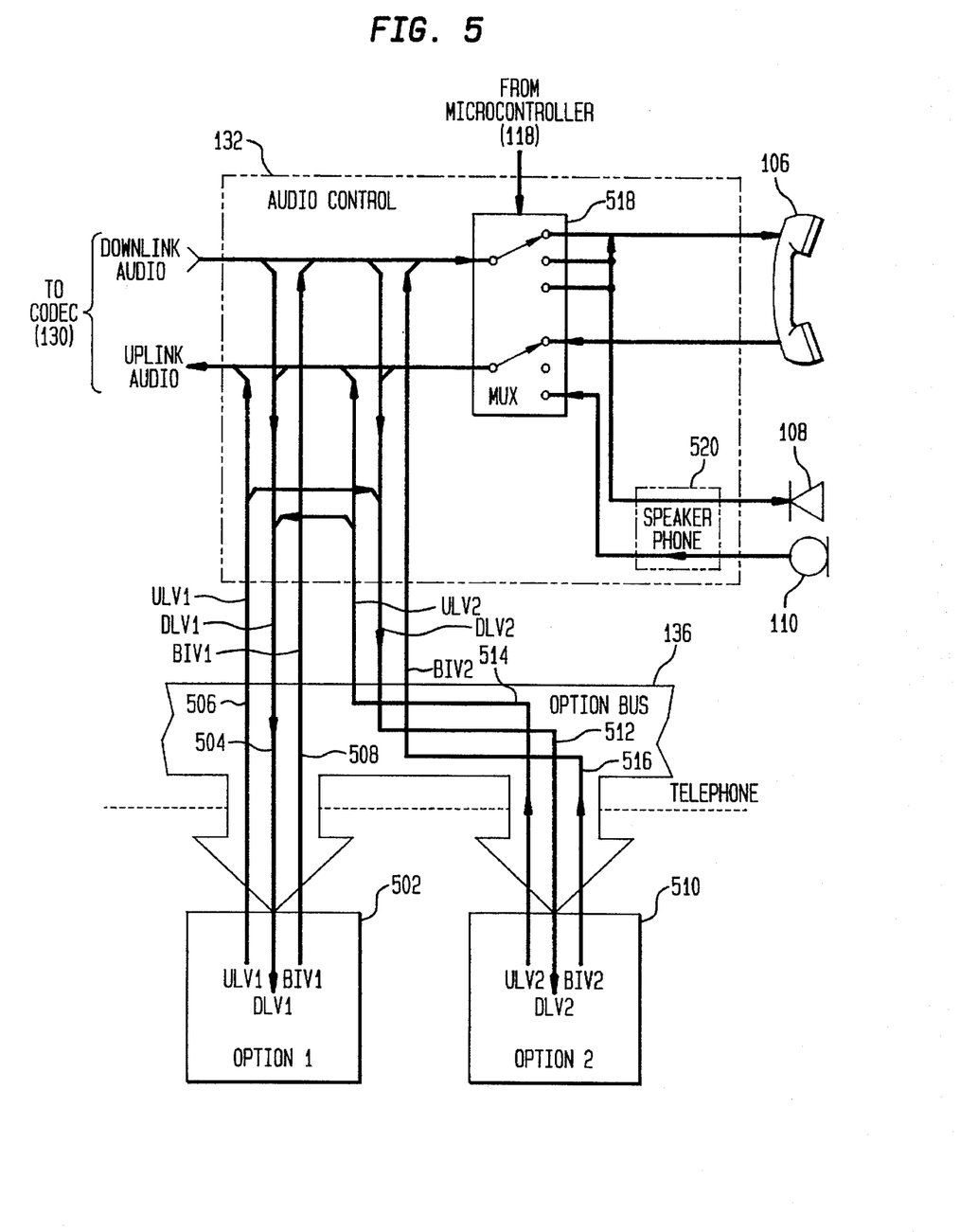
FIG. 5 is a more detailed diagram of the Audio Control Block of FIG. 2, showing an example of an interconnection with two options by way of the Option Bus.

For example, as illustrated by FIG. 5, in a telephone with two Option module 104 bays; module bay 1 502 would be connected to DLV1 504, ULV1 506, and BIV1 508, likewise module bay 2 510 would be connected to DLV2 512, ULV2 514, and BIV2 516. This facilitates the proper amplifying and combining of audio signals such that multiple modules can coexist.

An audio tone is produced whenever a key is pressed on the telephone keypad or DSS. This signal is carried on keytone (KT) line 316 to each module (not shown). All Option modules 104 have access to uplink and downlink audio whenever the telephone is active. Additionally, each Option module 104 receives, with its downlink audio, the uplink audio of the other Option modules 104. This allows the Option modules 104 to "talk" to each other. The Option modules 104 can send audio to the handset 106 receiver, the speaker 108 or both. Likewise, the Option modules 104 can receive audio from the handset 106 microphone or the speakerphone microphone 110.

Switching of these audio paths is controlled by the microcontroller 118 by way of a conventional multiplexer 518 and facilitated by the hierarchical option control protocol. For a telephone requiring hands-free speakerphone operation, a conventional speakerphone circuit 520 (FIG. 5) can be installed between the speaker 108 and microphone 110 and the multiplexer 518.

The Option Control Bus 126 is based on the conventional Serial Peripheral Interface (SPI) bus. The Option Control Bus 126 is a bit synchronous, full duplex, serial data bus. The Option Control Bus 126 is used to transfer control information between the microcontroller 118 and the option modules 104. Data from the microcontroller 118 to the Option modules 104 is carried on the Master Out/Slave In (MOSI) line 320. The Serial Clock (SCLK) line 322 carries the serial clocking signal for the data bits. The slave select (SS*n) line 324 carries a slave select signal which enables (or addresses) transfers to option modules 104. Each option module has a unique slave select line 324 such that only one is enabled at a given time. Thus in a telephone with three option ports the signals SS*1, SS*2 and SS*3 would be provided, respectively, to ports 1, 2 and 3. A RESET line 326 is provided on the Option Bus 136 to synchronize option modules during reset events, such as "power on", within the telephone.

Power to the Option modules 104 is provided by the Option Power Bus 124. These lines 328-336 provide the logic voltages +5V, -5V and Data Ground (DGND) as well as an auxiliary power supply, +VAUX and -VAUX, for Option modules 104 requiring higher levels of power.

Information flow between the microcontroller 118 and the option modules 104 is mediated by a hierarchical option control protocol. Devices internal to the telephone, such as the link interface 116 and the memory communicate with the microcontroller via the Option Control Bus 126. Though the interface is the same for these devices, the protocol used may differ from that of external option modules 104.

Figure 6:
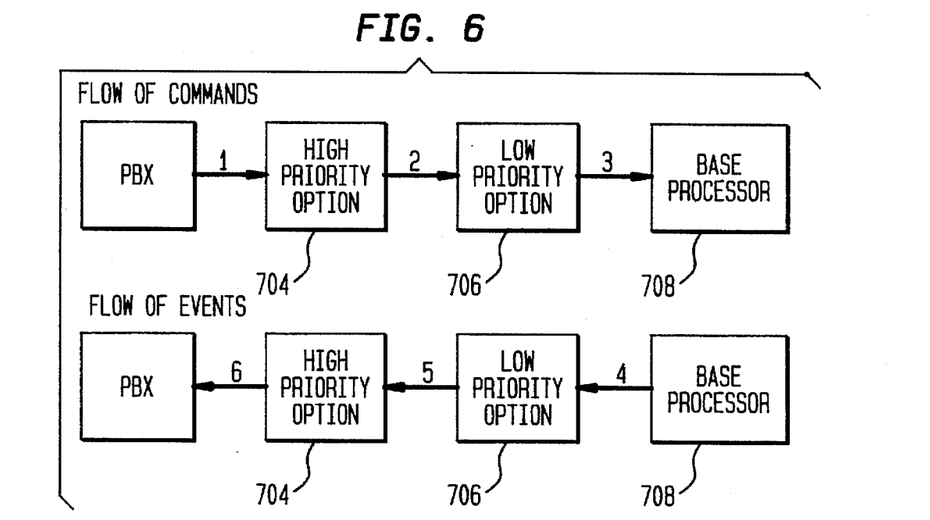
FIG. 6 is a flow diagram of message flow in an embodiment having two options.

FIG. 6 is an example of message flow in an embodiment with two options. Independent of the physical connection of FIG. 1, options are ordered according to priority. A high priority option would typically be a data option, such as a data communications option (DCO). A low priority option would typically be an extended keyboard option (DSS).

The flow of commands (messages from the PBX to the telephone) is illustrated by the set of blocks at the top of the figure. Commands flow first to the highest priority options (Message 1), to the lower priority option (Message2) and finally to the remainder of the telephone and its associated microcontroller 118 (via Message 3).

The flow of events (messages from the phone to the PBX) is illustrated at the bottom of FIG. 6. Events flow from the microcontroller 118 to the lowest priority option (Message 4), to the highest priority option (Message 5) to the PBX (Message 6).

The microcontroller 118 firmware is logically split into two components; the Base Processor and the Option Processor. The base processor controls the digital telephony functions of the telephone. The Option Processor distributes messages to options and the Base Processor.

At any point in the above-described process an option or the Base Processor can intercept, modify or synthesize a command or event message. The PBX can independently send messages as well. In addition, the system can include any number of smart options(from zero to N). The flow of messages is independent of the particular option module bay to which an option is connected. Options have no requirement of knowledge of the outside system to communicate. Operation codes contained in the messages contain no address information and only encode the direction (command or event) and the type of message.

Figure 7:
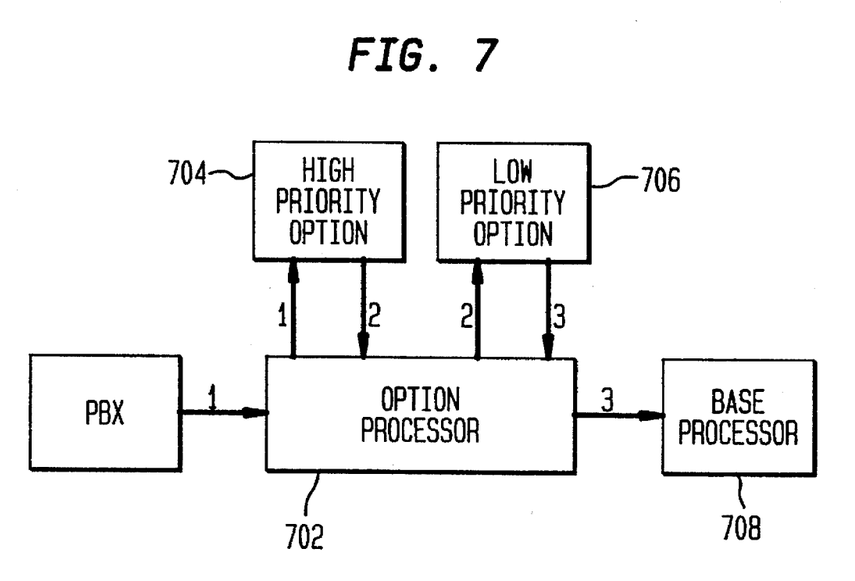
FIG. 7 is a flow diagram showing how command flow in the embodiment of FIG. 6 is accomplished.

FIG. 7 shows how the flow of command messages is accomplished. The PBX sends a Message 1 to the phone. Message 1 travels from the PBX (via the link interface 116) to the Option Processor 702. The Option Processor then sends Message 1 to the highest priority option (the high priority option 704). The high priority option 704 then responds with Message 2, which is sent to the Option Processor 702. Next, the Option Processor 702 sends Message 2 to the next highest priority option (the low priority option 706). In response, the low priority option 706 generates Message 3, which is sent to the Option Processor 702. As no more options exist, the Option Processor 702 sends Message 3 to the Base Processor 708.

Figure 8:
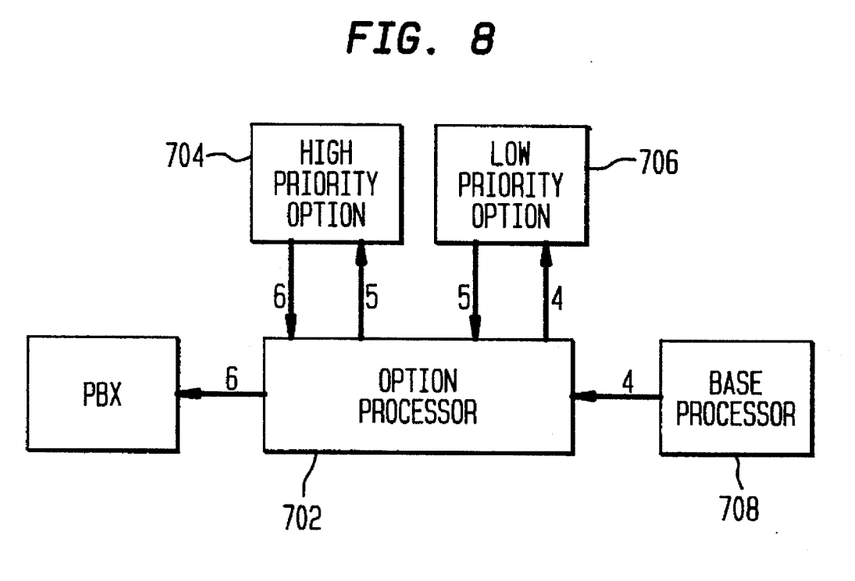
FIG. 8 is a flow diagram showing how event flow in the embodiment of FIG. 6 is accomplished.

This sequence is continued in FIG. 8 with the Base Processor 708 responding with an event, Message 4. The Base Processor 708 sends Message 4 to the Option Processor 702 which, in turn, relays Message 4 to the lowest priority option (the low priority option 706). The low priority option 706 responds with Message 5 and sends it to the Option Processor 702. Message 5 is then sent by the Option Processor 702 to the next highest priority option (the high priority option 704). The high priority option 704 responds with Message 6 and sends it to the Option Processor 702. As no more options exist, the Option Processor sends Message 6 to the PBX.

An example of a typical message sequence is a PBX request for phone ID, as illustrated by the following sequence. The PBX requests a phone ID from the telephone via Message 1. Message 1 is relayed to the high priority option 704 by the Option Processor 702. The high priority option 704 then sends Message 1 unchanged (as Message 2), to the Option Processor 702 which, in turn relays the message to the low priority option 706. The low priority option sends Message 2, unchanged, back to the Option Processor 702 as Message 3. The Option Processor 702 then relays Message 3 to the Base Processor 708.

The telephone base responds to Message 3, a request for phone ID, by identifying its ID, which its sends to the Option Processor as Message 4. The Option processor then relays this message to the next highest priority option (the low priority option 706). The low priority option 706 imparts its own ID on top of the Base phone ID (for example, if it is a DSS, indicating that more keys exist) and sends this collection of information (the Base phone ID and the low priority option ID), to the Option Processor as Message 5. The Option Processor then relays Message 5 to the high priority option 704. The high priority option 704 imparts its ID information on top of the message, for example indicating that it is a data communications option, and forwards this information (all three IDs), as an event (Message 6), to the Option Processor 702. When the Option Processor 702 receives Message 6, it relays it to the PBX. The final message (Message 6) indicates that the phone contains both a data communications option and additional keys as well as information about the base model.

It should be understood that an option can handle a message in a number of ways. Some options will receive the message, take some action, and then not forward or modify the message at all. For example, in order to turn a speakerphone option "on" in response to a PBX command, the microcontroller will send a command over the Option Bus. In response, the speaker-phone option will activate, however, it will not relay the message. Other options may modify a message without taking any action. For example, an extended keyboard option (DSS) may respond to a command to activate an indicator (e.g. light an LED) that the DSS determines is not present, by remapping the command to an indicator that is present elsewhere (e.g. on the main telephone). The DSS will then transmit the modified command to the Option Processor, in place of the original command which it received. The Option Processor then forwards the modified command to the telephone's main keyboard. Still other options will take some action and modify the message as well. For example, in response to a diagnostic command, each option may perform a test, append its status to the message and then forward the message on the next option by way of the Option Processor. As an example of another type of response, an Option for which a particular message is not intended will simply relay the message, unchanged, back to the Option Processor.

Commands (or fixed sequences of instruction codes) are sent to and from options with polled simultaneous command exchange on the Option Control Bus 126. Only one option at a time is selected by the telephone. This is referred to as polling. The Option Control Bus transfers are bi-directional, and both the telephone and the option will issue a command to each other when the telephone initiates the first transfer to an option. As the telephone can issue a poll to an option at any time, an option is required to have a command available for transfer within timing constraints. If a command with a specific function is not available, a NOP command is sent. A NOP can be issued by both the telephone and an option.

A convention for command acceptance is used to determine if the command from the telephone or option will be accepted. If the telephone issues a command, other than a NOP, it will always be accepted, regardless of the command issued by the polled option. If the polled option issues a command, other than a NOP, and the telephone issued a NOP, the polled option command is accepted. If both sides issue a NOP, the command transfer is complete and no data is sent. An individual command may include data associated with it or be a request for specific data.

An example of a command without associated data is an indication that the PBX issued a "phone reset". An example of a command with associated data is communication of a ROLMlink command. An example of a command with a request for data is a request for an option ID. Either the telephone or an option can issue any of the above-described types of commands.

An example of a command set is as follows: A No Operation (NOP) command is issued by the Option Processor or an Option when no operation needs to be performed. When both the Option Processor and the option issue a NOP, the poll is complete and no more Option Control Bus transfers will occur until the next poll of the option. In the case of only one side issuing a NOP, the non-NOP command is always accepted. This command enables the option processor to poll options for commands. It also enables options to indicate that they have no command to issue during a poll.

The Software Reset Option (RESET) command is issued by the Option Processor when it wants to perform a software reset of one or more options. The definition of the software reset will vary from option to option. The RESET command is issued twice to ensure synchronization. Options must respond to a single command, however, since they may be out of synchronization when the first reset command occurs. The RESET command is issued by the Option Processor whenever a microcontroller reset occurs.

The Report Specified ID (REPORT) command is issued by the Option Processor when it wants to request one of the following from an option: Option ID, Data Priority, Data Mask or Function ID. The command includes a single operand which identifies which information is to be reported. REPORT is a two byte command, while the response from the option is one byte containing the requested information. The information is reported by the option on the second byte of the command transfer.

The Base Receiving Data (BRD) command is a value which the Option Processor issues during the second transfer when the microcontroller is receiving a second transfer of a two byte command from an option. The value has no effect on the command accepted, however, it can help communicate the protocol externally to any external monitoring during debug.

The Option Receiving Data (ORD) command is issued by the option when it is receiving the second transfer of a two byte command from the Option Processor. This command is similar to BRD in that it has no effect on the command accepted, however, it can help communicate the protocol externally to any external monitoring during debug.

The Module Data (DATA) command can be issued by an option or the Option Processor. When the Option Processor issues DATA, control data, of an encoded type, is transferred to the option to which the command is directed. The data direction (command or event) is specified by a one bit field (D) of the command and the type of control data (TTT) is specified by a three bit field. Examples of control data types are Keyboard, Display, and Data (e.g. from a data communications option). When an option issues this command, and it is accepted, control data is transferred from the option to the Option Processor.

In the preferred embodiment, the timing of commands is as follows. Between the first and second command bytes (if a second command byte exists) at least 125 micro-seconds will have elapsed to allow for the option processor to respond and complete any other impending tasks. In addition, before a new command is issued, a minimum of 125 micro-seconds will elapse, to permit the option processor to respond and complete any other impending tasks.

Now that the invention has been described by way of the preferred embodiment, various enhancements and improvements which do not depart from the scope and spirit of the invention will become apparent to those of skill in the art. Thus it should be understood that the preferred embodiment has been provided by way of example and not by way of limitation. The scope of the invention is defined by the appended claims.

We claim:

1. In a digital telephone having an interface to a telephony communications switch, a microprocessor with an option processor means for distributing messages to option modules, said option modules operating to implement one or more functions related to the operation of said telephone, said functions being designated herein as options, and a base processor means for controlling the base digital telephone included therein and coupled to the switch, and a plurality of ports in said telephone connected to said base and option processor means via an internal bus for coupling the base processor means and the option processor means to one or more of the option modules, a method of communicating between the option modules and the base processor means comprising the steps of:

(a) determining, by the option processor means, a priority for each of the option modules;

(b) receiving, by the option processor means, a message from the switch;

(c) relaying the message, from the option processor means to a highest priority one of the option modules and from said highest priority one of the option modules back to the option processor means;

(d) continuing to relay the message from the option processor means to successive lower priority option modules and from each said successive option module back to the option processor means, in priority order, wherein:

upon receipt of a message from the option processor means by a receiving option module and prior to relaying said message back to the option processor means, said receiving option module is able to recognize said message as being pertinent to a feature which said receiving option module controls, and upon such recognition operates the feature in response to the message and modifies the message so as to generate a modified message; and, (e) relaying the modified message from a lowest priority one of the option modules to the option processor means and from said option processor means to the base processor means.

2. The method of claim 1 wherein the message comprises an indicator control command and the receiving option module is an extended keyboard option and wherein step (d) comprises the steps of the extended keyboard option intercepting the indicator control command, operating a keyboard indicator in response to the indicator control command; and, modifying the indicator control command before relaying the modified message back to the option processor means.

3. The method of claim 1 wherein in step (c) the message relayed from the option processor means comprises a command in a first telephony protocol which is not native to the base processor means and one of the option modules comprises a protocol emulator; and wherein step (d) includes the following substeps upon said recognition:

(1) intercepting the command to form an intercepted command;

(2) generating a translated command having a second protocol which is native to the base processor means; and (3) substituting within the message the translated command for the intercepted command before relaying the modified message back to the option processor means.

4. A base digital telephone, comprising:

an interface to a telephony communications switch;

option processor means, coupled to the switch, for distributing messages to option modules, said option modules operating to implement one or more functions related to the operation of said base digital telephone, said functions being designated herein as options;

base processor means, coupled to the switch, for controlling the base digital telephone;

a plurality of ports for coupling the base processor means and the option processor means via an internal bus to one or more of the option modules;

wherein, the option processor means comprises:

means for determining a priority for each of the options;

means for receiving a message from the switch; and, means for relaying the message to each of the option modules in priority order and wherein each of the option modules comprises:

means for recognizing the message as being pertinent to a feature which the respective option module controls;

means for operating the feature in response to the message and means for modifying the message so as to generate a modified message; and, means for relaying the modified message back to the option processor.

5. The base digital telephone of claim 4 wherein the message comprises an indicator control command and one of the option modules includes an extended keyboard device and wherein the extended keyboard device comprises:

means for intercepting the indicator control command;

means for operating an indicator in response to the indicator control command; and means for modifying the indicator control command before relaying the modified message back to the option processor means.

6. The digital telephone of claim 4 wherein the message comprises an incoming command in a first telephony protocol which is not native to the base processor means and one of the option modules comprises a protocol emulator, said protocol emulator comprising:

means for generating a translated command having a second protocol which is native to the base processor; and, means for substituting within the message, the translated command for the incoming command before relaying the modified message to the option processor means.

7. A plug-in option device system for use with a base digital telephone, said option device system including an option device comprising:

means for intercepting a message sent by a telephony switch to the base digital telephone;

means for recognition of the message as being pertinent to a feature which the option device controls;

means for operating the feature in response to said recognition; and, means for returning a modified message to the base digital telephone after receiving the message.

8. The option device system of claim 7 wherein said option device includes an emulator for translating a message comprising an incoming command in a first telephony protocol which is not native to the base digital telephone into a translated command which is native to the base digital telephone, and wherein the emulator comprises:

means for intercepting the incoming command in the message;

means for generating the translated command; and means for substituting within the message the translated command for the incoming command and returning the modified message to said base digital telephone.

9. A plug-in option device system for using with a base digital telephone, said option device system including an extended keyboard option device comprising:

means for intercepting an indicator control command;

means for operating an indicator in response to the indicator control command;

means for modifying the indicator control command; and means for returning said modified command to said base digital telephone.

10. A digital telephone, comprising:

link interface means for receiving digital data from a telephony line;

control means, connected to receive the digital data from the link interface means, for generating control messages in response to the digital data;

audio processing means, coupled to the link interface means, for decoding an audio portion of the digital data and for generating an analog audio signal from said audio portion of the digital data;

a plurality of ports for receiving auxiliary devices which are referred to as option modules, each of the ports being connected to receive the analog audio signal and at least a portion of the digital data; and, message passing means, coupled to the control means and each of the ports, for relaying the control messages between the option modules wherein the control messages are routed from the message passing means to a port for an associated option module and back from the port for the associated option module to the message passing means.

11. The digital telephone of claim 10 wherein each option module plugs into at least one port.

12. The digital telephone claim 10 wherein each of the ports are connected to receive downlink digital audio information from the link interface means and uplink digital audio information destined for the link interface means.

13. The digital telephone of claim 10 Wherein the control messages and the digital data received by the option modules are in the form of data frames.

14. The digital telephone of claim 10 wherein at least one option module comprises means for modifying at least one of the control messages generated by the control means to create a modified control message and sending the modified control message to the message passing means for relaying it to another one of the options modules.

15. The digital telephone of claim 10 wherein the message passing means comprises means for relaying the control messages between the option modules according to a hierarchical protocol.

16. The digital telephone of claim 10 wherein the option modules can do any of receive and modify a control message, receive and relay a control message without modification and receive and absorb a control message.

17. The digital telephone of claim 10 wherein the message passing means comprises option processor means for originating at least one of said control messages.

18. The digital telephone of claim 17 wherein said at least one of the control messages includes a command set.

19. The digital telephone of claim 18 wherein the command set includes a command for requesting an option identification number.

20. In a digital telephone having an interface to a telephony communications switch, an option processor and a base processor coupled to the switch, and a plurality of ports in said telephone connected to said base processor and said option processor via an internal bus for coupling the base processor and the option processor to one or more option modules, said option modules operating to implement one or more functions related to the operation of said telephone, said functions being designated herein as options, a method of communicating between the option modules and the base processor comprising the steps of:

(a) determining, by the option processor, a priority for each of the option modules;

(b) receiving, by the option processor, a message from the switch;

(c) relaying the message from the option processor to a highest priority one of the option modules and from said highest priority one of the option modules back to the option processor;

(d) continuing to relay the message from the option processor to successive lower priority option modules until a lowest priority option module is reached, and from each said successive lower priority option module back to the option processor, in priority order, wherein:
upon receipt of a message from the option processor by a receiving option module and prior to relaying said message back to the option processor, said receiving option module is able to recognize said message as being pertinent to a feature which said receiving option module controls, and upon such recognition will operate the feature in response to the message and modify the message so as to generate a modified message; and, (e) when said message reaches a lowest priority option, relaying the modified message from a lowest priority one of the option modules to the option processor and from said option processor to the base processor.

21. The digital telephone of claim 4 at least one of the option modules includes more than one option, and said at least one option module receives a respective priority number for each of the options.

* * * * *